United States Patent Office 3,409,638
Patented Nov. 5, 1968

3,409,638
REACTION OF AN ALKYL AROMATIC WITH MALEIC ANHYDRIDE TO PRODUCE A BENZYLSUCCINIC ANHYDRIDE
Charles M. Selwitz, Monroeville, Pa., assignor to Gulf Research & Development Company, Pittsburgh, Pa., a corporation of Delaware
No Drawing. Filed June 28, 1965, Ser. No. 467,754
6 Claims. (Cl. 260—346.8)

ABSTRACT OF THE DISCLOSURE

A process for preparing a benzylsuccinic anhydride which comprises reacting an alkyl aromatic with maleic anhydride in the presence of oxygen.

This invention relates to a process for preparing a benzylsuccinic anhydride, such as an α,α-dialkylbenzylsuccinic anhydride, an example of which would be α,α-dimethylbenzylsuccinic anhydride. These materials can be employed to cure epoxy resins or can be reacted with alcohols to prepare plasticizer esters.

In preparing the benzyl succinic anhydrides in accordance with the procedure of this invention, selected aryl compounds and maleic anhydrides are employed. The aryl compound employed can be any aryl compound carrying at least one alkyl substituent thereon, said alkyl substituent carrying at least one hydrogen on the carbon that is attached to said aryl ring. The alkyl substituent will have from one to 137 carbon atoms, preferably from two to 13 carbon atoms, such as methyl, ethyl, n-propyl, isopropyl, 1 - methyloctyl, n - dodecyl, 1 - methylnonahexacontyl, 3-phenyl-3-methylheptyl, 3,4,5-triethyldodecyl, 1-propyl - 3 - cyclohexylnonyl, 2 - methylpropyl, butyl, 1-methylpropyl, amyl, 1-methylbutyl, 2-ethylpentyl, etc. Examples of aryl compounds that can be employed are toluene, ethylbenzene, cumene, n-propylbenzene, 2-phenyloctane, n-dodecylbenzene, 4 - phenyl-6-cyclohexyltridecane, 2-methylpropylbenzene, butylbenzene, 2-(α-naphthyl)butane, n - amylbenzene, 1 - methylnonahexacontylbenzene, 1-methylbutylbenzene, 2-ethylpentylbenzene, methylethylbenzene, 1-propyl-4-(1-methylethyl)-naphthalene, meta-diisopropylbenzene, para-diisopropylbenzene, para,para' - di(1 - methyloctyl)diphenyl, para-(para - [1 - methylnonahexacontyl]phenyl)(para - [3-phenyl-3-methylheptyl]phenyl)benzene, 1-(3,4,5-triethyldodecyl)-5-(1-propyl - 3 - cyclohexylnonyl)anthracene, 2-(2 - methylpropyl) - 6 - butylphenanthrene, 1 - amyl-6-(1-methylbutyl)chrysene, 2,7-di(2-ethylpentyl)pyrene, etc.

To react with the alkylaryl compounds defined above, a maleic anhydride, such as maleic anhydride itself, or a mono-substituted maleic anhydride, such as citraconic anhydride, ethylmaleic anhydride, methoxymaleic anhydride, etc., is employed. The molar ratio of aryl compound to maleic anhydride employed can be from about 2:1 to about 100:1, but preferably will be from about 4:1 to about 10:1.

I have found that the alkylaryl compounds and the maleic anhydrides defined above can be made to react with each other to produce excellent yields of benzylsuccinic anhydrides by conducting the reaction in the presence of a controlled amount of a gas containing molecular oxygen.

The desired reaction is believed to proceed as follows, taking cumene and maleic anhydride as being representative reactants. Initially cumene in the presence of oxygen is believed to form cumyl and hydroperoxy free radicals:

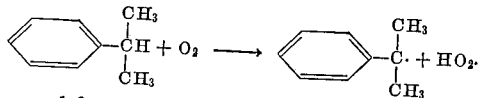

The cumyl free radical then adds to maleic anhydride to form α,α-dimethylbenzylsuccinyl anhydride radicals:

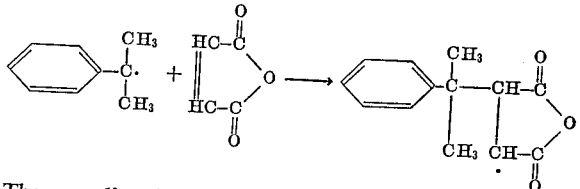

The α,α-dimethylbenzylsuccinyl anhydride radical so formed abstracts a hydrogen from cumene to form the desired α,α-dimethylbenzylsuccinic anhydride and a cumyl free radical:

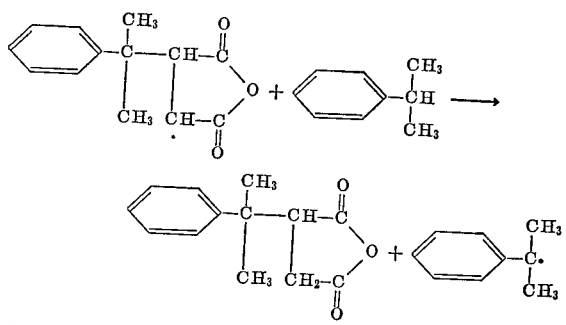

The cumyl free radical can then react with maleic anhydride, as disclosed above, and the chain of reactions are repeated until the reactants are consumed and the desired product is obtained.

The fact that oxygen works in this context is surprising. Even if it be assumed that cumene, for example, in the presence of oxygen would form cumyl radicals, it would be expected that where such radicals are themselves component reacting species in a reaction the presence of oxygen would be detrimental. This is so because it would be expected that oxygen would add to the cumyl radical or to the benzylsuccinyl anhydride radical or both to form cumylperoxy radicals or benzylsuccinyl anhydride peroxy radicals, respectively, either of which would tend to terminate the desired reaction and reduce appreciably the conversion and yield of the desired benzylsuccinic anhydride. Instead I have found that conversions and yields to the desired compounds when the reaction is carried out in the presence of a controlled amount of molecular oxygen are excellent.

Any gas containing molecular oxygen, such as oxygen itself, air, nitrogen-oxygen mixtures, helium-oxygen mixtures, etc., can be employed. The oxygen can be brought into contact with the reactants in any desired manner, for example, by passing a stream of the same therethrough during the reaction period. The amount of oxygen that can be employed can vary over wide limits, for example, at standard temperature and pressure, about 0.001 to about 4.0 liters of oxygen per liter of the defined aryl compound per hour, preferably about 0.02 to about 0.5 liters of oxygen per liter of the defined aryl compound per hour.

The reaction conditions must be carefully chosen. Thus the temperature will be from about 50° to 200° C., preferably from about 120° to about 180° C., with a temperature of about 145° to about 170° C. producing best results. The pressure can be, for example, from about 0.1 to about 120 pounds per square inch gauge, but preferably will be from about 15 to about 100 pounds per square inch gauge. The reaction time required can be as low as about 0.1 hour and as high as about 100 hours, although a reaction time of about one to about 10 hours is preferred.

Since molecular oxygen is employed herein, the reaction product obtained will not be contaminated therewith. The reaction products can be separated from the reaction mixture and from each other in any convenient or conventional manner, for example, by distillation at a temperature of about 100° to about 200° C. and a pressure of about 0.000014 to about 14 pounds per square inch gauge.

The process can further be understood by reference to the following:

Example I

Over a seven-hour period 6.2 liters of air (measured at ambient temperature) were passed through a mixture of 351.8 grams of cumene and 40 grams of maleic anhydride while maintaining the reaction mixture at atmospheric pressure and a temperature of 145° C. The reaction mixture was analyzed by gas chromatography, and it was found that 47.5 percent by weight of the maleic anhydride had been converted at an efficiency of 95 percent to the desired compound, α,α-dimethylbenzylsuccinic anhydride (43 grams).

Example II

When Example I was duplicated at 170° C. and at 40 pounds per square inch gauge, 65 percent by weight of the maleic anhydride was converted at an efficiency of 70 percent to α,α-dimethylbenzylsuccinic anhydride (43 grams).

Example III

Over a 7.5-hour period 0.45 liters of air (measured at ambient temperature) were passed through a mixture of 592.2 grams of meta diisopropylbenzene and 50 grams of maleic anhydride while maintaining the reaction mixture at atmospheric pressure and 170° C. Another 50 grams of maleic acid was added to the reaction mixture and the same air addition was continued for an additional period of six hours. Gas chromatography showed that 75.6 percent by weight of the maleic anhydride was converted at an efficiency of 87 percent to meta(1,1-dimethyl-2,3-propyl-dicarboxylic acid anhydride) isopropylbenzene (174 grams). This example also shows that if more than one alkyl substituent is on the ring, a product with only one of the substituents reacted with the maleic anhydride can be obtained. Other substituents can also be on the ring, for example, chloro, methoxy, 2,3-propyldicarboxylic acid anhydride, etc., without reacting, although they may have a slight retarding effect on the desired reaction.

Example IV

Over a six-hour period 0.46 liters of air (measured at ambient temperature) were passed through a mixture of 595.1 grams of cumene and 50 grams of maleic anhydride while maintaining the mixture at atmospheric pressure and 145° C. Gas chromatography showed that 58.3 grams of α,α-dimethylbenzylsuccinic anhydride was formed.

Example V

Over a 2½ hour period air at 60 pounds per square inch gauge was maintained over a stirred mixture of 344.5 grams of toluene and 40 grams of maleic anhydride at 180° C. Gas chromatography showed that 31 percent of the maleic anhydride was converted at an efficiency of 25 percent to benzylsuccinic anhydride (6.12 grams).

Obviously, many modifications and variations of the invention, as hereinabove set forth, can be made without departing from the spirit and scope thereof, and therefore only such limitations should be imposed as are indicated in the appended claims.

I claim:

1. In the process wherein an alkyl benzene, said alkyl substituent having from one to thirteen carbon atoms and carrying at least one hydrogen on the carbon that is attached to the benzene ring, is reacted with maleic anhydride at a temperature of about 50° to about 200° C. to obtain a benzylsuccinic anhydride, the improvement which comprises carrying out said reaction in the presence of molecular oxygen.

2. The process of claim 1 wherein the molar ratio of said alkyl benzene to the maleic anhydride is about 2:1 to about 100:1.

3. The process of claim 1 wherein molecular oxygen is passed through the reaction mixture at a rate of about 0.001 to about 4.0 liters per liter of said alkyl benzene per hour.

4. The process of claim 1 wherein said alkyl benzene is cumene.

5. The process of claim 1 wherein said alkyl benzene is meta diisopropylbenzene.

6. The process of claim 1 wherein said alkyl benzene is toluene.

References Cited

UNITED STATES PATENTS

| | | | |
|---|---|---|---|
| 2,692,210 | 10/1954 | Beavers | 260—346.8 |
| 3,272,843 | 9/1966 | Spatz | 260—346.8 X |

OTHER REFERENCES

Gould, Mechanisms and Structure in Organic Chemistry, Halt-Dryden, 1959, p. 710, additional pages 705–6.

NICHOLAS S. RIZZO, *Primary Examiner.*

DONALD G. DAUS, *Assistant Examiner.*